United States Patent
Minamida et al.

(10) Patent No.: US 6,633,664 B1
(45) Date of Patent: Oct. 14, 2003

(54) THREE-DIMENSIONAL STRUCTURE ACQUISITION METHOD, APPARATUS AND COMPUTER READABLE MEDIUM

(75) Inventors: Kouki Minamida, Yokosuka (JP); Mikio Shinya, Yokosuka (JP); Tatsuki Matsuda, Kawasaki (JP); Mikito Notomi, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/568,291

(22) Filed: May 10, 2000

(30) Foreign Application Priority Data

May 11, 1999 (JP) .......................................... 11-130204

(51) Int. Cl.[7] .................................................. G06K 9/00
(52) U.S. Cl. ..................... 382/154; 345/419; 348/208.1
(58) Field of Search ................................. 382/100, 154; 345/418, 419, 420, 619, 679; 356/12; 705/36, 152; 348/208.99, 208.1, 208.3, 208.6, 42, 43, 50, 52

(56) References Cited

U.S. PATENT DOCUMENTS

| 5,796,427 A | * | 8/1998 | Suzuki | .................... | 348/208.6 |
| 6,342,918 B1 | * | 1/2002 | Inou et al. | ................ | 348/208.1 |

FOREIGN PATENT DOCUMENTS

| JP | 7146121 A | 6/1995 |
| JP | 818848 A1 | 1/1996 |
| JP | 8181903 A | 7/1996 |
| JP | 10116341 A | 5/1998 |
| JP | 1137721 A | 2/1999 |
| JP | 11183139 A | 7/1999 |
| JP | 11339021 A | 12/1999 |
| JP | 11339043 A | 12/1999 |

OTHER PUBLICATIONS

R.C. Bolles, H.H. Baker and D.H. Marimont, "Epipolar-Plane Image Analysis: An Approach to Determining Structure from Motion", IJCV, vol. 1, No. 1, 1987, pp. 7–55.

Z. Zhu, G. Xu, X. Lin, "Constructing 3D Natural Scene from Video Sequences with Vibrated Motions", Proc. IEEE VRAIS, '98, 1998, pp. 105–112.

C. Tomasi, T. Kanade, "Shape and Motion from Image Streams: A Factorization Method—Full Report on the Orthographic Case" Computer Science Technical Report, CMU–CS–104, Carnegie Mellon Univ., 1992, pp. 1–36.

Z. Zhang, et al., "A Robust Technique for Matching Two Uncalibrated Images Through the Recovery of the Unknown Epipolar Geometry", Artificial Intelligence, vol. 78, 1995, pp. 87–119.

M. Shinya, T. Saito, T. Mori and N. Osumi, "VR Models from Epipolar Images: An Approach to Minimize Errors in Synthesized Images", LNCS 1352 Computer Vision—ACCV '98, vol. II, pp. 471–478.

(List continued on next page.)

Primary Examiner—Samir Ahmed
Assistant Examiner—Vikkram Bali
(74) Attorney, Agent, or Firm—Kenyon & Kenyon

(57) ABSTRACT

A three-dimensional structure acquisition method is provided, wherein the three-dimensional structure acquisition method includes: an input step for inputting images from a camera to a computer; a first extraction step for extracting a three-dimensional structure from the images by a predetermined method; a generation step for generating depth maps from the three-dimensional structure; a calibration step for correcting image deviation due to camera fluctuation by using the depth maps; a second extraction step for extracting a three-dimensional structure from the calibrated images by the predetermined method; and an outputting step for outputting the three-dimensional structure to a storage device. The predetermined method may be based on epipolar plane image analysis.

12 Claims, 5 Drawing Sheets

OTHER PUBLICATIONS

T. Morita and T. Kanade, "A Sequential Factorization Method for Recovering Shape and Motion from Image Streams", IEEE Transactions on Pattern Analysis and Machine Intelligence, vol. 19, No. 8, Aug. 1997, pp. 858–867.

M. Notomi, S. Ozawa and H. Zen, "Modeling of Urban Scene by Motion Analysis", IEICE, D–II vol. J81–D–II, No. 5, pp. 872–879, May 1998.

M. Pollefeys, R. Koch and L.V. Gool; "Self–Calibration and Metric Reconstruction in Spite of Varying Unknown Internal Camera Parameters", ICCV, 1998, pp. 90–95.

* cited by examiner

FIG.4A SPATIO-TEMPORAL IMAGE — SECTION PLANE
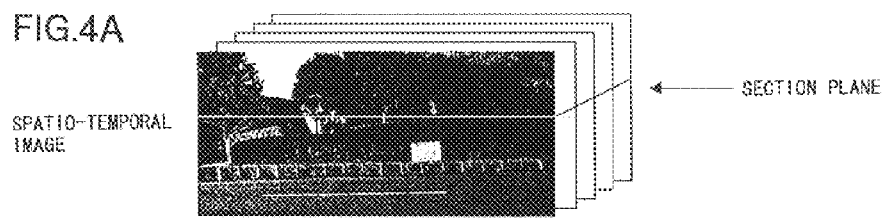
FIG.4B EPIPOLAR PLANE IMAGE OF INPUT IMAGES
FIG.4C EPIPOLAR PLANE IMAGE OF SYNTHESIZED IMAGES (CONVENTIONAL METHOD)
ERROR  ERROR
IMPROVED
FIG.4D (ONE TIME LOOP ITERATION)
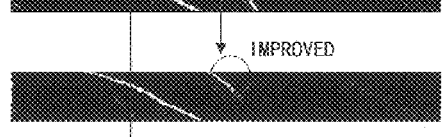
IMPROVED
FIG.4E (TWO TIMES LOOP ITERATION)

THREE-DIMENSIONAL STRUCTURE ACQUISITION METHOD, APPARATUS AND COMPUTER READABLE MEDIUM

BACKGROUND OF THE INVENTION

1. Field of the Invention

The present invention relates to a three-dimensional structure acquisition method, an apparatus and a computer readable medium for generating a realistic image from an original image.

In recent years, three-dimensional computer graphics is in increasing demand in various fields such as games, movies, commercials and the like. However, high labor costs are incurred to create a three-dimensional model for three-dimensional computer graphics. Thus, a method for generating the three-dimensional model automatically or semiautomatically from a real object or a real landscape is required.

2. Description of the Related Art

Conventionally, various inputting methods are proposed for inputting a three-dimensional structure such as an object or a landscape. For example, in a document, R. C. Bolles, H. H. Baker and D. H. Marimont, "Epipolar-Plane Image Analysis: An Approach to Determining Structure from Motion" IJCV, vol.1, No.1, 1987, pp.7–55 (which will be referred to as document 1 in the following), a method called epipolar plane image analysis is disclosed. In the epipolar plane image analysis, many images of a landscape taken by a video camera are input, spatio-temporal images are generated, and a three-dimensional structure is obtained by analyzing linear patterns shown in the x-t plane image. This method is simple and easy. But, it is necessary to accurately move the camera with uniform linear motion. When the uniform linear motion is accompanied by unknown motion due to hand shake, vibration and the like, the patterns shown in the x-t plane image do not become linear. Therefore, accuracy for extracting the three-dimensional structure significantly decreases.

In Japanese laid-open patent application No.11-339043 "METHOD FOR INPUTTING THREE DIMENSIONAL SHAPE AND RECORDING MEDIUM FOR RECORDING THREE DIMENSIONAL SHAPE INPUT PROGRAM" (which will be referred to as document 2 in the following), a method for calibrating an image as preprocessing of the method in the document 1 is proposed. In the method, camera fluctuation due to camera shake is estimated from paths of feature points. The estimated camera motion is used for calibrating the image as if the camera keeps uniform linear motion. According to this method, accurate uniform linear motion of the camera becomes unnecessary and the epipolar plane image analysis becomes easy. Similarly, in a method proposed in a document Z. Zhu, G. Xu and X. Lin, "Constructing 3D Natural Scene from Video Sequences with Vibrated Motions," Proc. IEEE VRAIS '98, 1998, pp. 105–112, camera fluctuation is estimated from optical flow. Then, the image calibrated as if the camera keeps uniform linear motion by using the estimation data.

However, according to the method in the document 2, there is a problem in that accuracy of three-dimensional structure calculation deteriorates when the depth dimension of the three-dimensional structure is large.

In addition, in a method shown in documents, C. Tomasi and T. Kanade, "Shape and Motion from Image Streams : a Factorization Method—Full Report on the Orthographic Case," Computer Science Technical Report, CMU-CS-104, Carnegie Mellon Univ., 1992 (which will be referred to as document 3 in the following) and C. J. Poelman and T. Kanade, "A Paraperspective factorization method for Shape and Motion Recovery," IEEE PAMI, vol. 19, no. 3, 1997, pp. 206–218, three-dimensional coordinates of the image feature points are obtained by inputting a plurality of images of a landscape, determining correspondence of feature points and using a factorization method. This method can be easily performed because a special apparatus or special consideration is unnecessary for inputting an image. However, there is a defect in that error becomes large when the depth dimension of the three-dimensional object is large since the camera model used in the method is not the perspective transform model.

Further, in Japanese laid-open patent application No. 7-146121 "RECOGNITION METHOD AND DEVICE FOR THREE-DIMENSIONAL POSITION AND ATTITUDE BASED ON VISION", a camera calibration method is disclosed. In the method, a camera position and attitude are estimated from an image of a three-dimensional object taken by the camera, in which the position and the size of the three-dimensional object is known. However, according to this method, a three-dimensional structure of an unknown object or landscape can not be obtained.

In Japanese laid-open patent application No. 8-181903"IMAGE PICKUP APPARATUS", an apparatus is disclosed in which a plurality of images are input, translation and rotation deviations between the images are estimated and a merged image is synthesized. However, according to this method, the three-dimensional structure of an object or a landscape can not be obtained.

In an apparatus disclosed in Japanese laid-open patent application No. 11-183139 "SECTIONAL AND THREE-DIMENSIONAL SHAPE MEASURING APPARATUS", three-dimensional structure of an object is measured from a plurality of images taken by projecting slit light to the object. However, there is a defect that it is expensive to realize the apparatus since a camera needs to operate together with an apparatus for projecting the slit light.

SUMMARY OF THE INVENTION

It is an object of the present invention to provide a three-dimensional structure acquisition method, an apparatus and a computer readable medium for acquiring a three-dimensional structure of an object or a landscape accurately even when the depth dimension of the object or the landscape is large.

The above object of the present invention is achieved by a three-dimensional structure acquisition method comprising:

an input step for inputting images from a camera to a computer;

a first extraction step for extracting a three-dimensional structure from the images by a predetermined method;

a generation step for generating depth maps from the three-dimensional structure;

a calibration step for correcting image deviation due to camera fluctuation by using the depth maps;

a second extraction step for extracting a three-dimensional structure from calibrated images by the predetermined method; and an outputting step for outputting the three-dimensional structure to a storage device.

According to the above-mentioned invention, the three dimensional structure can be acquired accurately since images which are accurately calibrated by using the depth maps are used.

In the three-dimensional structure acquisition method, the predetermined method may be based on epipolar plane image analysis.

According to this invention, the three dimensional structure can be acquired accurately by using the epipolar image analysis.

The three-dimensional structure acquisition method may further include the steps of:

generating synthesized images after extracting the three-dimensional structure;

calculating differences between the synthesized images and the calibrated images;

wherein the generation step, the calibration step and the second extraction step are performed repeatedly until the differences become smaller than or equal to a predetermined value.

According to the above-mentioned invention, accuracy of the three-dimensional structure is further improved. In addition, the process end can be judged by comparing the synthesized images and the calibrated images.

In addition, according to the present invention, a three-dimensional structure acquisition apparatus and a computer readable medium storing a three-dimensional structure acquisition program are provided.

BRIEF DESCRIPTION OF THE DRAWINGS

Other objects, features and advantages of the present invention will become more apparent from the following detailed description when read in conjunction with the accompanying drawings, in which:

FIGS. 4A–4E are diagrams for explaining the effect of the present invention;

DETAILED DESCRIPTION OF THE PREFERRED EMBODIMENTS

Figure 1:
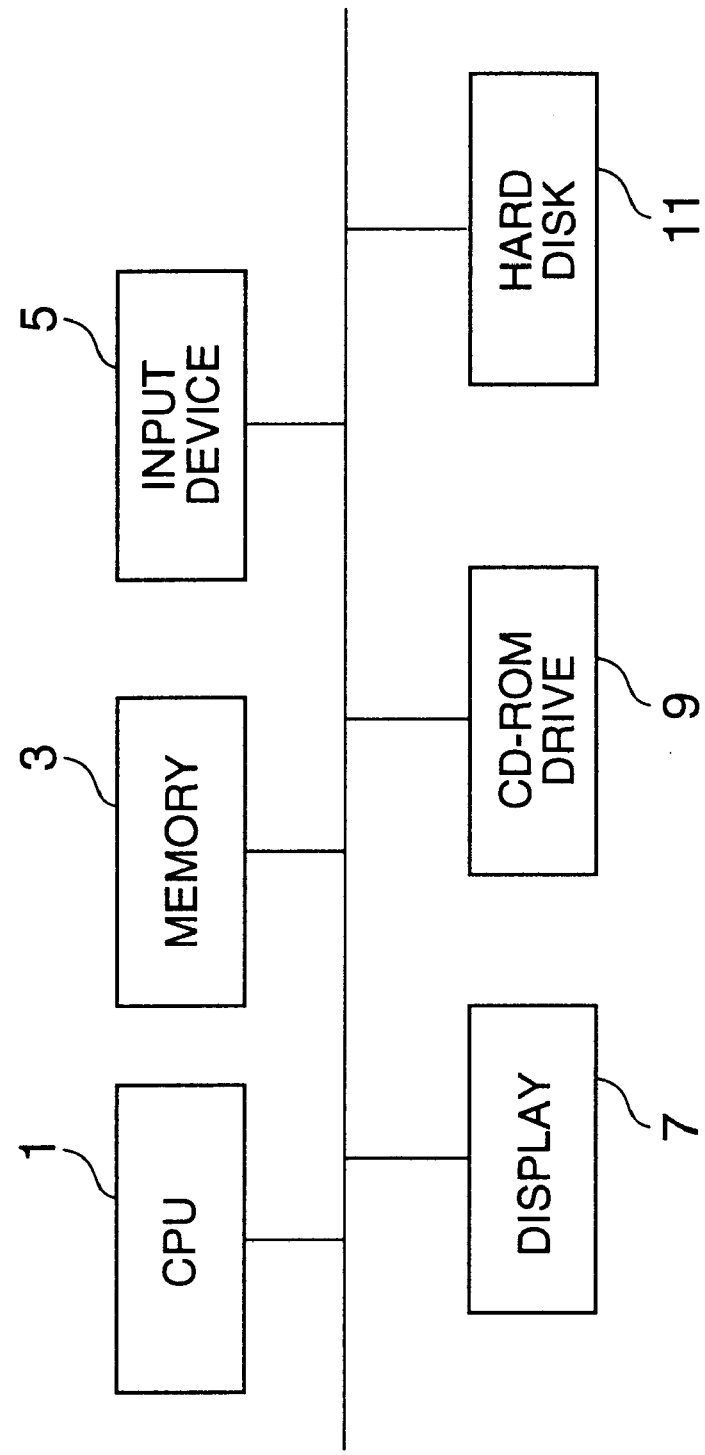
FIG. 1 shows a configuration example of a three-dimensional structure acquisition apparatus according to the present invention.

Before describing the principle of the present invention, the estimation method of the camera fluctuation shown in the document 2 will be described. In the method, a plurality of feature points on a screen are tracked in the time direction and the input images are deformed such that each tracked path of each feature point appears on the same scan line, In the method, a pinhole camera model is used as a camera model for image input. When there is no camera rotation and the z axis is set in the direction of the line of sight and the x axis is set in the scan direction, a projected point $(X_s, Y_s)$ of an object point $(x, y, z)$ is represented by $$X_s = ax/z \quad (1)$$

$$Y_s = ay/z \quad (2)$$

wherein a is an intrinsic camera parameter.

When the camera rotates about the x axis by $-\alpha$, rotates about the y axis by $-\beta$ and rotates about the z axis by $-\gamma$ at the time t, the projected point $(X'_s, Y'_s)$ at this time is obtained as shown below.

First, each rotation matrix is represented as follows.

$$R_x = \begin{pmatrix} 1 & 0 & 0 \\ 0 & \cos\alpha & \sin\alpha \\ 0 & -\sin\alpha & \cos\alpha \end{pmatrix} \quad (3)$$

$$R_y = \begin{pmatrix} \cos\beta & 0 & -\sin\beta \\ 0 & 1 & 0 \\ \sin\beta & 0 & \cos\beta \end{pmatrix} \quad (4)$$

$$R_z = \begin{pmatrix} \cos\gamma & -\sin\gamma & 0 \\ \sin\gamma & \cos\gamma & 0 \\ 0 & 0 & 1 \end{pmatrix} \quad (5)$$

Thus, the whole rotation matrix R is represented as follows.

$$R = R_z R_y R_x \quad (6)$$

When the rotation angles $-\alpha$a, $-\beta$ and $-\gamma$ are small, R can be approximated as follows.

$$R \simeq \begin{pmatrix} 1 & -\gamma & -\beta \\ \gamma & 1 & \alpha \\ \beta & -\alpha & 1 \end{pmatrix} \quad (7)$$

Then, the projected point is represented as follows.

$$\begin{pmatrix} x \\ y \\ z \end{pmatrix} = R \begin{pmatrix} x' \\ y' \\ z' \end{pmatrix} \quad (8)$$

$$X'_s = ax'/z' \quad (9)$$

$$Y'_s = ay'/z' \quad (10)$$

When using the approximate expression (7), $(X_s, Y_s)$ is represented as follows.

$$X_s \simeq X'_s + X'_s Y'_s \alpha/a - (a + X'^2_s/a)\beta - Y'_s\gamma \quad (11)$$

$$Y_s \simeq Y'_s + (a + Y'^2_s/a)\alpha - X'_s Y'_s \beta/a + X'_s \gamma \quad (12)$$

When the camera position deviates from the x axis by $-\delta_y$, $-\delta_z$, $(X_s, Y_s)$ is represented as follows in this case.

$$X_s = ax'/(z' - \delta_z) \quad (13)$$

$$Y_s = a(y' - \delta_y)/(z' - \delta_z) \quad (14)$$

When $-\delta_y$ and $-\delta_z$ are small, it can be approximated as follows.

$$X_s \simeq X'_s + X'_s(\delta_z/z) \quad (15)$$

$$Y_s \simeq Y'_s - a\delta_y/z + Y'_s(\delta_z/z) \quad (16)$$

In the above equation, the second term and the third term depend on z. However, z can be regarded as a constant value if z does not vary greatly. On the basis of equations (12) and (16), deviations from the projected point $D_{xs} = X_s - X'_s$, $D_{ys} = Y_s - Y'_s$ due to direction and position fluctuation of the camera can be represented as follows.

$$D_{xs}(X'_s, Y'_s) \simeq B(t)X_s^2 + A(t)X_s Y_s + D(t)X_s - C(t)Y_s - \alpha\beta \quad (17)$$

$$D_{ys}(X'_s, Y'_s) \simeq A(t)Y'^2_s + B(t)X'_s Y'_s + C(t)X_s - D(t)Y'_s \quad (18)$$

$$A(t) = \alpha(t)/\alpha \quad (19)$$

$$B(t) = -\beta(t)/\alpha \tag{20}$$

$$C(t) = \gamma(t) \tag{21}$$

$$D(t) = \delta_z/z \tag{22}$$

$$E(t) = \alpha(a + \delta_y/z) \tag{23}$$

In these equations, A(t)~E(t) are constant values determined for each frame t and represent distortion of the input image. When the camera constant a is known, $\alpha(t)$, $\beta(t)$, $\gamma(t)$, $\delta_Y$, $\delta_z$ can be obtained from these equations. Thus, deviation in the x axis direction $D_{xs} = X_s - X'_s$ can be calculated.

If A(t)~E(t) is estimated from the tracked paths of more than five feature points $(X_i(t), Y_i(t))$, $D_{ys}$ can be obtained. Then, by using the following equation, $$f_{new}(x,y;t) = f(x + D_{IS}(x,y), y + D_{ys}(x,y); t') \tag{24}$$

the distortion can be decreased by deforming the input image. In the equation, $f_{new}$ represents the calibrated input image. The estimation is realized by obtaining A(t)~E(t) which minimize $$H = \min \sum_i \sum_t |Y_i(t) + D_{ys}(X_i(t), Y_i(t)) - Y_i(0)|^2 \tag{25}$$

by using the method of least squares. In addition, by using $$\min \sum_t \text{median}(|Y_i(t) + D_{ys}(X_i(t), Y_i(t)) - Y_i(0)|^2) \tag{26}$$

robust estimation can be used (Z. Zhang, et. al., "A robust technique for matching two uncalibrated images through the recovery of the unknown epipolar geometry," Artificial Intelligence, vol. 78, 1995, pp. 87–119)

The method shown in the document 2 is described thus far. The estimation method of camera fluctuation shown in the document 2 has a defect. According to the document 2, the optimization problem for the equations (25) and (26) is solved from the tracking path $\{(X'_s, Y'_s)\}$ of the feature points. Then, the camera movement parameters (rotation angles $\alpha(t)$, $\beta(t)$ and $\delta(t)$, and translational movement $\delta_y(t)$, $\delta_z(t)$) can be estimated. However, properly speaking, if the depth coordinate (z) of an object is not known, the equations (15) and (16) can not be applied. In the method used in the document 2, z is regarded as a constant value assuming that the variation of the depth (z) of the object is small. Then, $\delta_y/z$ or $\delta_z/z$ is regarded as one variable for estimation (equations (22) and (23)). According to this method, accuracy of estimation is low because the depth is regarded as constant even when the object has the large depth dimension.

According to the present invention, a three-dimensional structure is input by using the method of the document 2. Next, a depth map is generated by using the three-dimensional structure (after mentioned step 7 in FIG. 2). Then, estimation of camera position and attitude is performed accurately by using depth information obtained from the depth map such that accurate extraction of the three-dimensional structure is realized.

Figure 2:
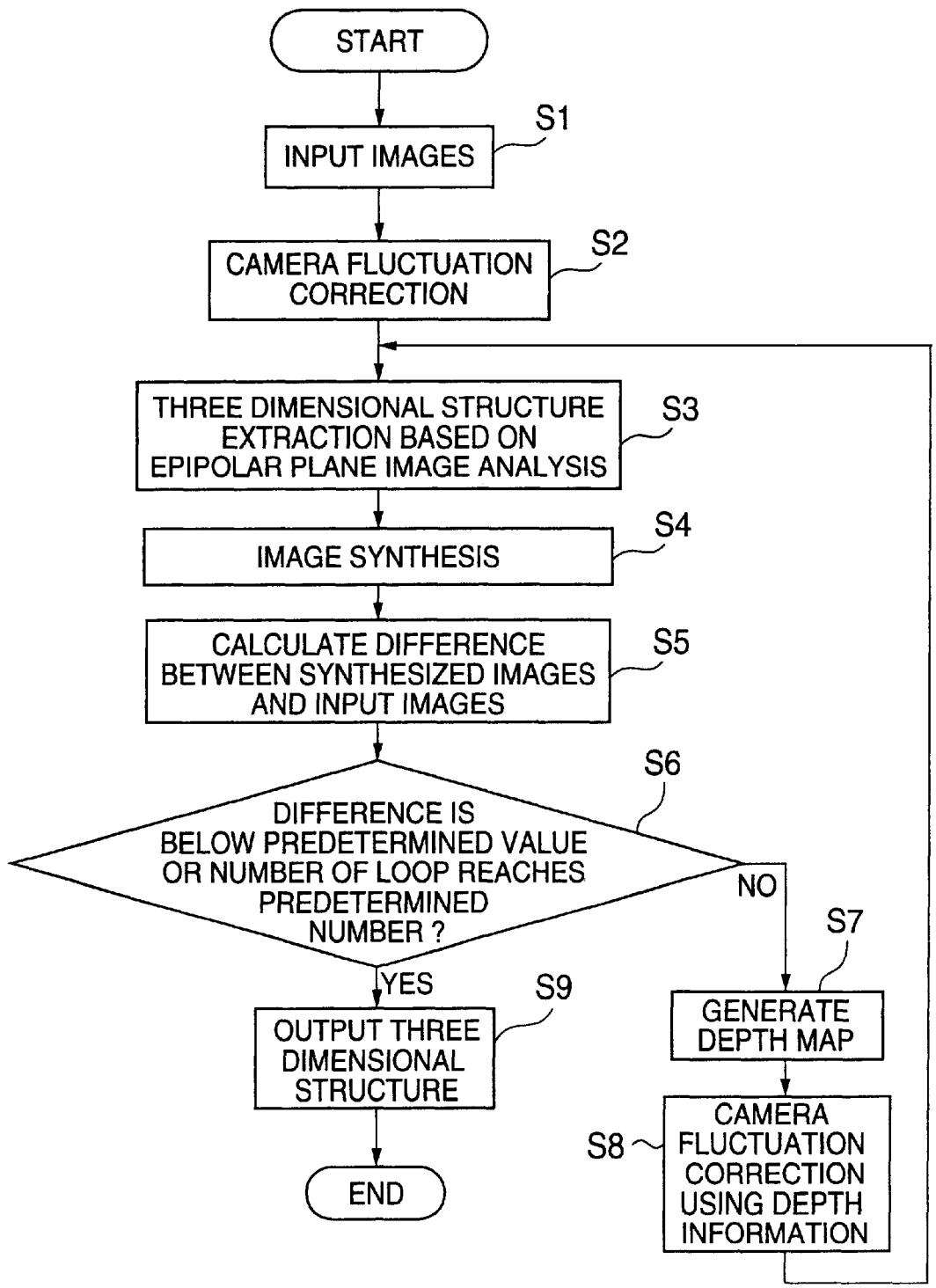
FIG. 2 is a flowchart showing a three-dimensional structure acquisition process according to the first embodiment of the present invention.

More precisely, for this purpose, a three-dimensional structure is extracted from a plurality of images taken by a video camera by using a combination of the image calibration method in the document 2 and the three-dimensional structure extraction method (based on epipolar plane image analysis) in the document 1 and the like (after mentioned steps 1–3 in FIG. 2). As mentioned above, according to the image calibration method shown in the document 2, camera fluctuation parameters are estimated from paths obtained by tracking feature points in the images. Then, by using the camera fluctuation parameters, input images are calibrated as if the images are taken by the video camera of uniform linear motion. According to the three-dimensional structure extraction method shown in the document 1, a spatio-temporal image is formed from a plurality of images taken while keeping the video camera in uniform linear motion. Then, the three-dimensional structure is acquired by analyzing linear patterns in the x-t plane image. At this time, it should be noted that the three-dimensional structure is acquired as a relative relation between the camera movement path and speed. In addition, according to the method shown in document 2, since camera fluctuation is obtained by estimation, camera fluctuation at the time of taking the input image is known.

Next, depth maps are generated from the above-mentioned three-dimensional structure, wherein the depth maps can be regarded as images virtually taken from the same camera position and attitude as those when the object is taken (after mentioned step 7 in FIG. 2). More precisely, first, the depth maps are generated by rendering a three-dimensional structure by using the Z buffer method which is generally known, then extracting the Z buffer. Each pixel in the Z buffer includes the depth from the view point to the object point corresponding to the pixel. This depth is referred to as the first depth estimation value.

When camera movement was estimated in the first place, the depth was unknown. However, the estimated depth is obtained now by the above-mentioned depth map generation processing. Then, by utilizing this depth information, the estimation of the camera fluctuation is performed again (the after-mentioned step 8 shown in FIG. 2). In the above-mentioned equations (15) and (16), the depth (z) was regarded as a constant value since z was unknown. On the other hand, according to the present invention, a value can be set in z since the depth information is obtained from the depth map. That is, camera fluctuation can be estimated by using the following equations on the basis of the above equations (17) and (18).

$$D_{IS}(X'_s, Y'_s) = \alpha X'_s Y'_s/\alpha - \beta(\alpha + X'^2_s/\alpha) - \gamma Y'_s + (\delta_z/z')X'_s \tag{27}$$

$$D_{ys}(X'_s, Y'_s) = \alpha(a + Y'^2_s/a) - \beta X'_s Y'_s a + \gamma X'_s + (\delta_z/z')Y'_s - a\delta_y/z' \tag{28}$$

$D_{xs}(X'_s, Y'_s)$: calibration amount of the coordinates $(X'_s, Y'_s)$ of the input image in the x axis direction, $D_{ys}(X'_s, Y'_s)$: calibration amount of the coordinates $(X'_s, Y'_s)$ of the input image in the y axis direction, $\alpha$, $\beta$, $\gamma$, $\delta_y$, $\delta_z$: variables representing camera movement which are determined for each input image a: intrinsic camera parameter, $X'_s$, $Y'_s$: coordinates of the input image, $Z'$: depth of the object at the point of coordinates $(X_s, Y'_s)$ of the input image.

The above mentioned equations represent the amount by which the pixel in the input image needs to be moved for correcting fluctuation of the input image due to hand shake. Z' is obtained from a pixel value of the coordinates (X's, Y's) of the depth map. The unknowns $\alpha$, $\beta$, $\gamma$, $\delta_y$, $\delta_z$ which represent camera fluctuation can be estimated by using the method of least squares from the path $(X_i(t), Y_i(t))$ of the feature points in the input images.

The method of least squares will be described in the following.

If the camera moves linearly in the x axis direction, the y coordinate of a feature point should be constant. Thus, the unknowns $\alpha$, $\beta$, $\gamma$, $\delta_Y$, $\delta_z$ are determined by using the method of least squares such that the condition that the y coordinate should be constant is satisfied as much as possible. That is, by solving $$H = \min \sum_i \sum_t |Y_i(t) + D_{ys}(X_i(t), Y_i(t)) - Y_i(0)|^2,$$

the unknowns are determined. Or, as is described in a document, Z. Zhang, et. al., "A robust technique for matching two uncalibrated images through the recovery of the unknown epipolar geometry," Artificial Intelligence, vol. 78, 1995, pp. 87–119, by using the following equation, $$\min \sum_t \operatorname{median}(|Y_i(t) + D_{ys}(X_i(t), Y_i(t)) - Y_i(0)|^2)$$

robust estimation can be performed by excluding outlying values with median operation. By using the unknowns $\alpha$, $\beta$, $\gamma$, $\delta_y$, $\delta_z$ which are obtained in the above mentioned way, $D_{xs}$, $D_{ys}$ are calculated from the equations (27) and (28). Then, by using the following equation, each pixel in the input image is moved such that the image is calibrated.

$$f+_{new}(X_s,Y_s;t)=f(X'_s+D_{IS}(X'_s,Y'_s), Y'_s+D_{ys}(X'_s, Y'_s);t)$$

Here, f represents the input image before it is calibrated. $f+_{new}$ represents the input image after it is calibrated.

In the above mentioned image calibration method of the present invention, the depth value is used for image calibration as shown in equations (27) and (28). On the other hand, in the method of the document 2, the depth is regarded as constant. Therefore, according to the method of the present invention, the input image can be calibrated accurately. Thus, by inputting the calibrated images and by performing the three-dimensional structure extraction again, the three-dimensional structure extraction can be performed more accurately even when the depth dimension of the three-dimensional object is large.

In addition, by performing the above mentioned process repeatedly, accuracy of the depth value further improves.

Any number of times for performing the process can be selected. In the following embodiment, two methods are described. In one method, the process is repeated until the difference between the after mentioned synthesized image and the input image becomes below a predetermined value. In another method, the process is repeated a predetermined number of times.

As mentioned above, according to the estimation algorithm for estimating the camera fluctuation according to the document 2, the input image is calibrated by translation of pixels of the mapped two dimensional image regardless of the depth between the object and the camera. On the other hand, according to the present invention, the calibration amount is estimated by using the depth information. Thus, the calibration amount is estimated such that the movement on the two dimensional pixels is small for a distant object and the movement is large for a near object. The above-mentioned equations (27) and (28) represent such meaning. That is, in the fourth term in the right side of the equation 27 and in the fourth and fifth terms in the right side of the equation 28, a variable (z') which represents the depth exists. Thus, according to the present invention, the movement can be estimated more accurately than the method in which the depth is regarded as constant.

(First Embodiment)

FIG. 1 shows a configuration example of a three-dimensional structure acquisition apparatus according to the present invention. The three-dimensional structure acquisition apparatus includes a CPU (Central Processing Unit) 1, a memory 3, an input device 5, a display 7, a CD-ROM drive 9 and a hard disk 11. The CPU 1 controls the three-dimensional structure acquisition apparatus. The memory 3 contains data and programs which are processed by the CPU 1. The input device 5 is, for example, a camera for inputting an image. The display 7 displays an image. The CD-ROM drive 9 drives a CD-ROM, and reads from the CD-ROM. The hard disk 11 stores three-dimensional structure data acquired according to the present invention. The three-dimensional structure acquisition apparatus operates by a program causing a computer to perform the three-dimensional structure acquisition process of the present invention. The program may be preinstalled in the three-dimensional acquisition apparatus. Otherwise, the program may be loaded in the hard disk 11 via the CD-ROM drive 9 from a CD-ROM which stores the program. When the program is started, a predetermined part of the program is loaded into the memory 3 for executing the process of the present invention. According to the present invention, an image is input from the input device 5 and the three-dimensional structure extraction is performed. Then, the result is output to the display 7 or the hard disk 11.

In the following, the procedure for acquiring the three-dimensional structure executed by the three-dimensional structure acquisition apparatus will be described with reference to FIG. 2. This procedure is based on the principle of the present invention.

In step 1, an object is taken by a camera while translating the camera in a direction perpendicular to the optical axis for inputting the images of the object. At this time, unknown motion may be included in camera motion due to hand shake or the like.

In step 2, as camera fluctuation correction, the image is deformed in order to remove the effect of the camera fluctuation. This processing can be performed by using the equation (24). After that, the epipolar plane image analysis is performed.

For performing the epipolar plane image analysis, a condition needs to be satisfied. The condition is that the object is taken by the camera while translating the camera, in a direction perpendicular to the optical axis. In the following, the translation in the direction perpendicular to the optical axis will be called ideal motion. When the camera motion includes the unknown motion due to the hand shake or the like, accuracy of the epipolar plane image analysis significantly deteriorates. The camera fluctuation correction in step 2 is a process for obtaining an image which looks as if it is taken while the camera moves ideally for improving accuracy of the epipolar plane image analysis. In the process in step 2, amount of difference from ideal motion of the camera (which is called camera fluctuation) is estimated so as to deform the input images on the basis of the estimation.

In step 3, the images which are corrected in step 2 are input, and a three-dimensional structure is extracted. This process can be performed, for example, by the method described in the document 1.

In step 4, images are synthesized by using the three-dimensional structure extracted in step 3. The images are considered to be generated virtually by taking the picture of the object from points of the camera motion trail. For performing the image generation process, a general perspective transform method and the Z buffer method can be used, but the present invention is not limited to these methods. The synthesized images generated in step 4 are used in determining when to exit from the loop contained in FIG. 2.

In step 5, the difference between each synthesized image and respective input image is calculated for the evaluation. When the estimation of the camera fluctuation is accurate, the synthesized images and the input images are exactly the same. However, in reality, they are not the same since the estimation is not perfectly accurate. Thus, the difference is evaluated in step 5. More specifically, in the embodiment, the following equation $$\varepsilon = \sum_t \sum_x \sum_y \|I_t(x, y) - S_t(x, y)\|^2$$

is used. Here,

ε: difference, $I_t(x, y)$: intensity at coordinates (x, y) of the "t"th input image, $S_t(x, y)$: intensity at coordinates (x, y) of the "t"th synthesized image. Instead of the above equation, other equations can be used.

In step 6, evaluation of condition is performed. In this step, it is determined whether the difference is smaller than or equal to a predetermined value or the number of loop iterations reaches a predetermined number. When the condition is satisfied, the process exits the loop. When it is not satisfied, the number of loop iterations is incremented by one and the loop iteration continues. The predetermined value and number used in this step are properly set respectively by the operator and provided.

Figure 3:
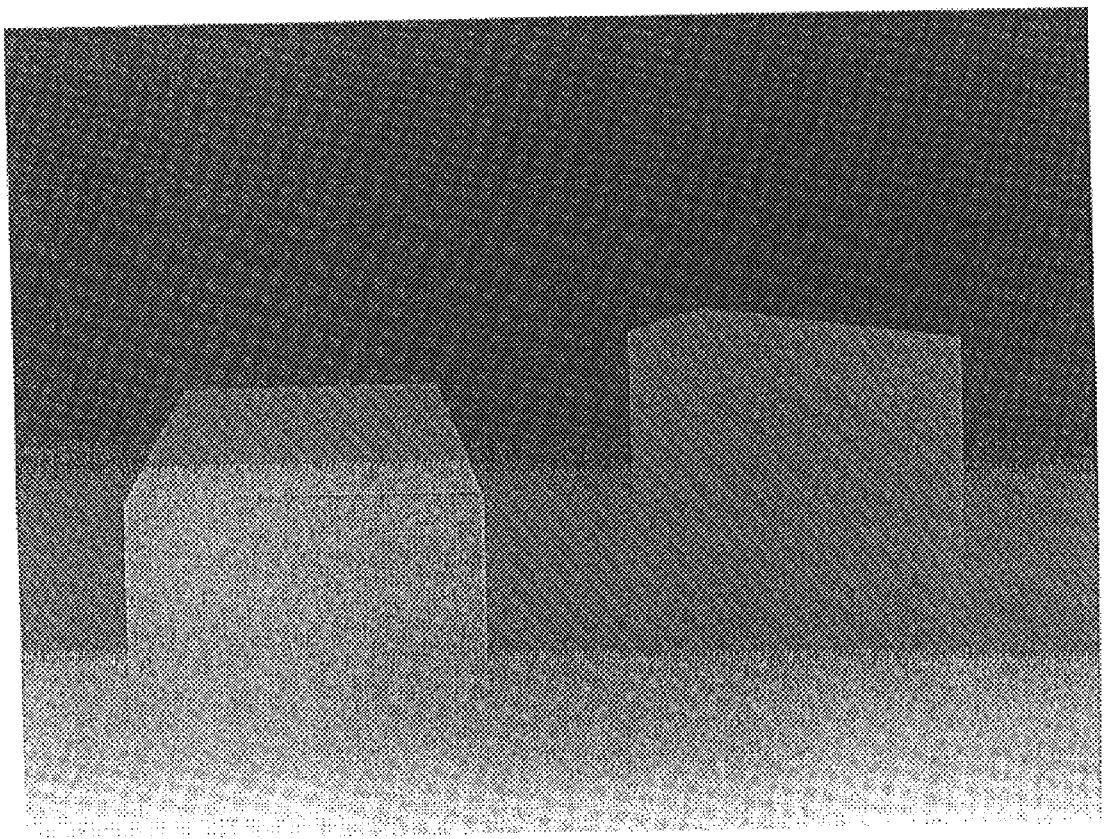
FIG. 3 is an example of a depth map.

In step 7, depth maps are generated, each of which depth maps corresponds to each synthesized image. The depth map is a gray scaled image in which the intensity of each pixel in the image corresponds to the distance to the object indicated by the pixel. FIG. 3 is an example of the depth map.

In step 8, camera fluctuation correction is performed by using the depth information. That is, camera fluctuation correction is performed accurately by using the depth information included in the above mentioned depth map. This process can be performed by using the equations (27)–(30) as described in the principle of the present invention.

When it is determined that the difference reaches the predetermined value or the number of loop iterations reaches the predetermined number in step 6, the three-dimensional structure which is finally acquired is output to ,for example, a file in step 9.

FIGS. 4A–4E show the result of the above mentioned process. A landscape is used as the input image. For performing the three-dimensional structure extraction process by the epipolar plane image analysis in step 3, a combination of the method in the document 1 and the DP-Strip method in a document, M. Shinya, T. Saito, T. Mori and N. Osumi, "VR Models from Epipolar Images: An Approach to Minimize Errors in Synthesized Images," LNCS 1352 Computer Vision—ACCV '98, Vol. II, pp. 471–478, is used. The DP-Strip method is for determining topology of the surface reconstructed from object points. In this method, the topology is determined by dynamic programming such that the difference between the synthesized image and the input image becomes minimum. By determining the topology of the surface, an occlusion in which the foreground surface hides a distant object can be reproduced.

FIG. 4A shows a spatio-temporal image of the input images. In addition, FIGS. 4B–4E show epipolar plane images for explaining the effect of the present invention. FIG. 4B shows an epipolar plane image at the section shown in FIG. 4A. It can be said that the smaller the difference between the synthesized images extracted in step 3 and the input images, the more accurately the structure is reconstructed.

FIG. 4C shows an epipolar plane image generated by using the three-dimensional structure which is obtained without using the present invention. As shown in the figure, occlusions which are circled are different from those in the epipolar plane image of the input images. This means that accuracy by the conventional method is low.

FIG. 4D shows an example in which the loop of the present invention is applied to the same input data one time by setting the number of the loop iteration as one. As shown in the figure, the circled occlusion image becomes closer to the input image, which means the image is improved. It is considered that this effect is brought by improved depth estimation of the present invention.

FIG. 4E shows an example in which the loop of the present invention is applied to the same input data two times by setting the number of the loop iteration as two. As shown in FIG. 4E, in addition to the improved part shown in FIG. 4D, the circled occlusion image is improved. It is considered that this means that the depth estimation is further improved.

(Second Embodiment)

Figure 5:
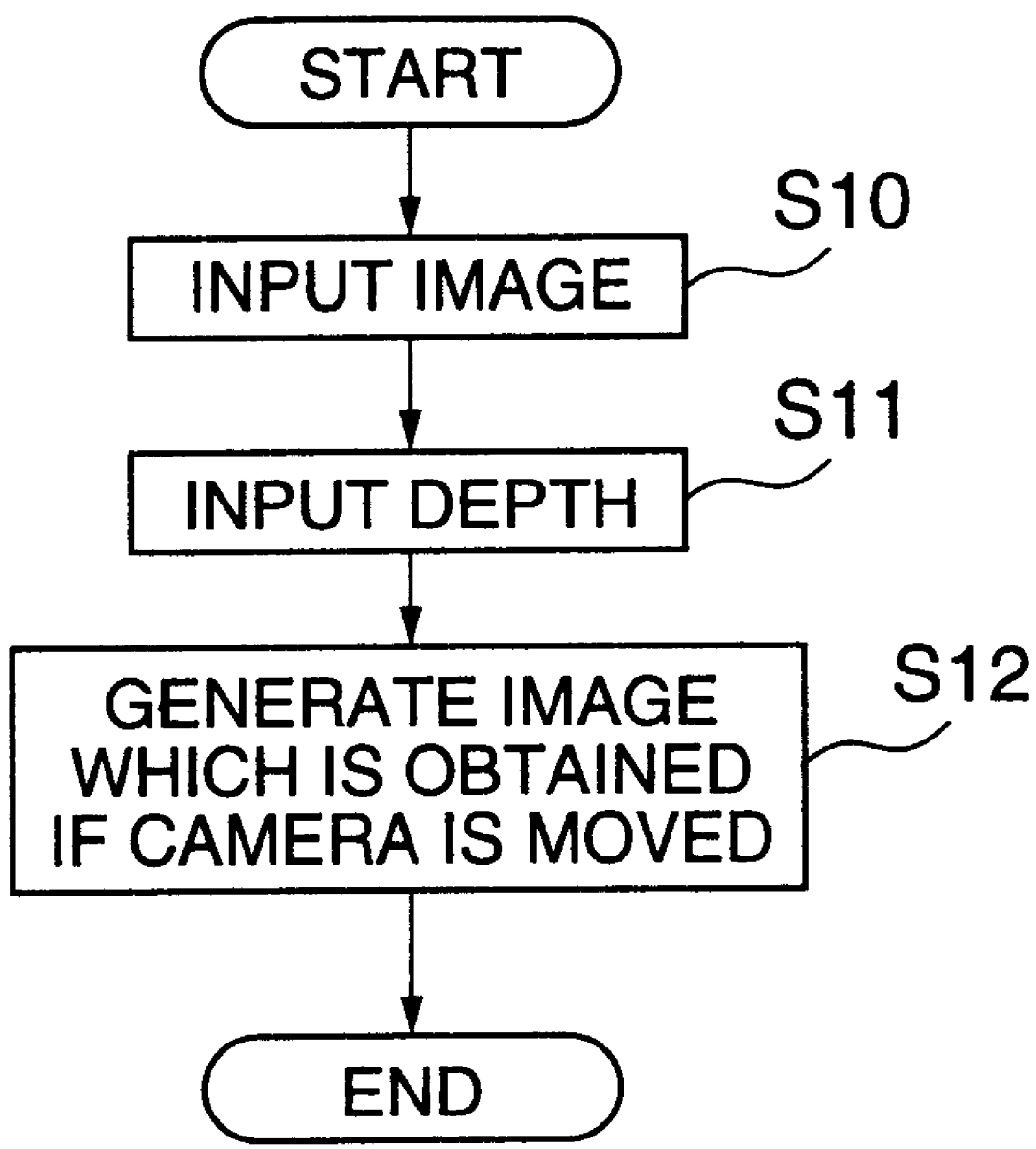
FIG. 5 is a flowchart showing a process of a second embodiment.

Next, the second embodiment of the present invention will be described. FIG. 5 is a flowchart showing the process of the second embodiment. In the second embodiment, an example will be shown in which an image which is the same as an image taken by a camera at a position and attitude is calculated from an image taken by a camera at a different position and attitude.

In step 10, an image is input. Here, the equations (27) and (28) can be used for representing shift amount of each pixel in the image if the camera is fluctuated from the original position and attitude. The camera fluctuation is represented by the rotation angles α, β, γ around the x, y, z axes, respectively, and small translation distances $\delta_y$, $\delta_z$ in the y, z axis direction. However, the pixel shift amount $D_{xs}$, $D_{ys}$ can not be calculated accurately unless the depth to the object z' corresponding to the pixel is known.

Thus, in step 11, the depth value of each pixel of the input image is input. For obtaining the depth value, for example, if the input image is one of many images taken by a video camera, the depth can be calculated by obtaining the shape of the object by means of the factorization method shown in the document 3.

In step 12, an image which should be obtained if the camera is fluctuated is acquired. More precisely, the depth value obtained in step 11 is assigned to z' in the equations (27) and (28) for obtaining $D_{xs}$, $D_{ys}$. Then, each pixel is shifted by using the equation (24) such that the image taken from another camera position which is represented by parameters α, β, γ, $\delta_y$, $\delta_z$ is generated. Thus, the image taken from another camera position can be generated accurately by using the equations (27) and (28) of the present invention.

The present invention is applicable to various three-dimensional structure extraction methods other than the epipolar plane image analysis method. Especially, the present invention can be effectively applied to a three-dimensional structure extraction method which is sensitive to unexpected camera fluctuation.

The present invention is not limited to the specifically disclosed embodiments, and variations and modifications may be made without departing from the scope of the invention.

What is claimed is:

1. A three-dimensional structure acquisition method comprising:
   an input step for inputting images from a camera to a computer;
   a first extraction step for extracting a three-dimensional structure from said images by a predetermined method;
   a generation step for generating depth maps from said three-dimensional structure;
   a calibration step for correcting image deviation due to camera fluctuation by using said depth maps;
   a second extraction step for extracting a three-dimensional structure from calibrated images by said predetermined method; and
   an outputting step for outputting said three-dimensional structure to a storage device.

2. The three-dimensional structure acquisition method as claimed in claim 1, wherein said predetermined method is based on epipolar plane image analysis.

3. The three-dimensional structure acquisition method as claimed in claim 1, further comprising the steps of:
   generating synthesized images after extracting said three-dimensional structure;
   calculating differences between said synthesized images and said calibrated images;
   wherein said generation step, said calibration step and said second extraction step are performed repeatedly until said differences become smaller than or equal to a predetermined value.

4. The three-dimensional structure acquisition method as claimed in claim 2, said calibration step including a step of converting input images f into $f^{+}_{new}$ by using the following equations $$D_{xs}(X'_s,Y'_s)=\alpha X'_s Y'_s/a-\beta(a+X'^{2}_s/a)-\gamma Y'_s+(\delta_z/Z')X'_s,$$

$$D_{ys}(X'_s,Y'_s)=\alpha(a+Y'^{2}_s/a)-\beta X'_s Y'_s/a+\gamma X'_s+(\delta_z/Z')Y'_s-a\delta_y/Z',$$

$$f^{+}_{new}(X_s,Y_s;t)=f(X'_s+D_{xs}(X'_s,Y'_s),\ Y'_s+D_{ys}(X'_s,Y'_s);t),$$

wherein the z axis is set in the direction of the line of sight and the x axis is set in the scan direction, a being a camera constant, $(X_s, Y_s)$ being a projected point of an object point (x, y, z), $(X'_s, Y'_s)$ being a projected point when the camera is rotated about the x axis by $-\alpha$, about the y axis by $-\beta$ and about the z axis by $-\gamma$ and when the camera position deviates from the x axis by $-\delta_y, -\delta_z$, $(D_{xs}, D_{ys})$ being a shift amount of the projected point due to camera fluctuation, Z' being depth at the point of $(X'_s, Y'_s)$ which is obtained from said depth map.

5. A three-dimensional structure acquisition apparatus comprising:
   input means for inputting images from a camera;
   first extraction means for extracting a three-dimensional structure from said images by a predetermined method;
   generation means for generating depth maps from said three-dimensional structure;
   calibration means for correcting image deviation due to camera fluctuation by using said depth maps;
   second extraction means for extracting a three-dimensional structure from calibrated images by said predetermined method; and
   a storage device for storing extracted said three-dimensional structure.

6. The three-dimensional structure acquisition apparatus as claimed in claim 5, wherein said predetermined method is based on epipolar plane image analysis.

7. The three-dimensional structure acquisition apparatus as claimed in claim 5, further comprising:
   means for generating synthesized images after extracting said three-dimensional structure;
   means for calculating differences between said synthesized images and said calibrated images;
   wherein processing by said generation means, said calibration means and said second extraction means are performed repeatedly until said differences become smaller than or equal to a predetermined value.

8. The three-dimensional structure acquisition apparatus as claimed in claim 6, said calibration means including means for converting input images f into $f^{+}_{new}$ by using following equations $$D_{xs}(X'_s,Y'_s)=\alpha X'_s Y'_s/a-\beta(a+X'^{2}_s/a)-\gamma Y'_s+(\delta_z/Z')X'_s,$$

$$D_{ys}(X'_s,Y'_s)=\alpha(a+Y'^{2}_s/a)-\beta X'_s Y'_s/a+\gamma X'_s+(\delta_z/Z')Y'_s-a\delta_y/Z',$$

$$f^{+}_{new}(X_s,Y_s;t)=f(X'_s+D_{xs}(X'_s,Y'_s),\ Y'_s+D_{ys}(X'_s,Y'_s);t),$$

wherein the z axis is set in the direction of the line of sight and the x axis is set in the scan direction, a being a camera constant, $(X_s, Y_s)$ being a projected point of an object point (x, y, z), $(X'_s, Y'_s)$ being a projected point when the camera is rotated about the x axis by $-\alpha$, about the y axis by $-\beta$ and about the z axis by $-\gamma$ and when the camera position deviates from the x axis by $-\delta_y, -\delta_z$, $(D_{xs}, D_{ys})$ being a shift amount of the projected point by camera fluctuation, Z' being depth at the point of $(X'_s, Y'_s)$ which is obtained from said depth map.

9. A computer readable medium storing program code for causing a computer to acquire a three-dimensional structure, said computer readable medium comprising:
   input program code means for inputting images from a camera to a computer;
   first extraction program code means for extracting a three-dimensional structure from said images by a predetermined method;
   generation program code means for generating depth maps from said three-dimensional structure;
   calibration program code means for correcting image deviation due to camera fluctuation by using said depth maps;
   second extraction program code means for extracting a three-dimensional structure from calibrated images by said predetermined method; and
   outputting program code means for outputting said three-dimensional structure to a storage device.

10. The computer readable medium as claimed in claim 9, wherein said predetermined method is based on epipolar plane image analysis.

11. The computer readable medium as claimed in claim 9, further comprising:
    program code means for generating synthesized images after extracting said three-dimensional structure;
    program code means for calculating differences between said synthesized images and said calibrated images;
    wherein processing by said generation program code means, said calibration program code means and said second extraction program code means are performed repeatedly until said differences become smaller than or equal to a predetermined value.

12. The computer readable medium as claimed in claim 10, said calibration program code means including program code means for converting input images f into $f^+_{new}$ by using following equations $$D_{xs}(X'_s,Y'_s)=\alpha X'_s Y'_s/a-\beta(a+X'^2_s/a)-\gamma Y'_s+(\delta_z/Z')X'_s,$$

$$D_{ys}(X'_s,Y'_s)=\alpha(a+Y'^2_s/a)-\beta X'_s Y'_s/a+\gamma X'_s+(\delta_z/Z')Y'_s-a\delta_y/Z',$$

$$f^+_{new}(X_s,Y_s;t)=f(X'_s+D_{xs}(X'_s,Y'_s),\ Y'_s+D_{ys}(X'_s,Y'_s);t),$$

wherein the z axis is set in the direction of the line of sight and the x axis is set in the scan direction, a being a camera constant, $(X_s, Y_s)$ being a projected point of an object point $(x, y, z)$, $(X'_s, Y'_s)$ being a projected point when the camera is rotated about the x axis by $-\alpha$, about the y axis by $-\beta$ and about the z axis by $-\gamma$ and when the camera position deviates from the x axis by $-\delta_y$, $-\delta_z$, $(D_{xs}, D_{ys})$ being a shift amount of the projected point by camera fluctuation, Z' being depth at the point of $(X'_s, Y'_s)$ which is obtained from said depth map.

* * * * *

UNITED STATES PATENT AND TRADEMARK OFFICE
CERTIFICATE OF CORRECTION

PATENT NO. : 6,633,664 B1
DATED : October 14, 2003
INVENTOR(S) : Kouki Minamida et al.

It is certified that error appears in the above-identified patent and that said Letters Patent is hereby corrected as shown below:

Column 1,
Line 13, change "is" to -- are --.
Line 27, change "vol. 1" to -- Vol. 1 --.
Line 41, change "laid-open patent application" to -- Laid-Open Patent Application --.

Column 2,
Lines 15, 26, 33 and 34, change "laid-open patent application" to -- Laid-Open Patent Application --.
Line 3, change "factorization method" to -- Factorization Method --.
Line 4, change "vol. 19, no. 3" to -- Vol.19, No. 3 --.

Column 4,
Line 20, change "-αa" to -- -α --.

Column 5,
Line 24, change "$(x,y)i^1)$" to -- $(x,y);t)$ --.
Line 35, change "vol. 78" to -- Vol. 78 --.
Line 42, change "$\delta(t)$" to -- $\gamma(t)$ --.

Column 7,
Line 13, change "vol. 78" to -- Vol. 78 --.

Signed and Sealed this

Twenty-eighth Day of June, 2005

JON W. DUDAS
*Director of the United States Patent and Trademark Office*